United States Patent [19]

Djorup

[11] Patent Number: 4,794,795
[45] Date of Patent: Jan. 3, 1989

[54] DIRECTIONAL THERMAL ANEMOMETER TRANSDUCER

[76] Inventor: Robert S. Djorup, 20 Lovewell Rd., Wellesley, Mass. 02181

[21] Appl. No.: 866,604

[22] Filed: May 23, 1986

[51] Int. Cl.$^4$ .......................... G01F 1/68; G01P 5/12
[52] U.S. Cl. .................................. 73/189; 73/204.14
[58] Field of Search ..................... 73/204, 189, 118.2

[56] References Cited

U.S. PATENT DOCUMENTS

| | | | |
|---|---|---|---|
| 3,220,255 | 11/1965 | Scranton | 73/204 |
| 3,352,154 | 11/1967 | Djorup . | |
| 3,363,462 | 1/1968 | Sabin . | |
| 3,603,147 | 9/1971 | Dorman | 73/204 |
| 3,604,261 | 9/1971 | Olin . | |
| 3,677,085 | 7/1972 | Hayakawa . | |
| 3,900,819 | 8/1975 | Djorup . | |
| 3,991,624 | 11/1976 | Davies . | |
| 3,995,481 | 12/1976 | Djorup . | |
| 4,024,761 | 5/1977 | Djorup . | |
| 4,206,638 | 6/1980 | Djorup . | |
| 4,213,335 | 7/1980 | Peter et al. | 73/204 |
| 4,279,147 | 7/1981 | Djorup . | |
| 4,373,387 | 2/1983 | Nishimura | 73/204 |
| 4,503,706 | 3/1985 | Kolodjski | 73/204 |
| 4,523,462 | 6/1985 | Kolodjski | 73/204 |
| 4,549,433 | 10/1985 | Gneiss et al. . | |
| 4,587,842 | 5/1986 | Handtmann | 73/204 |

OTHER PUBLICATIONS

Olin "Split-Film Anemometer Sensors" in Instruments and Control Systems 6/70 pp. 106-109.
"Modern Developments in Fluid Dynamics" edited by S. Goldstein, Composed by the Fluid Motion Panel of the Aeronautical Research Committee and Others, vol. 1, pp., 21-26, 36-41 and 59-65.

Primary Examiner—Herbert Goldstein

[57] ABSTRACT

The directional thermal anemometer transducer includes an electrically non-conducting substrate having at least two areas substantially thermally isolated from one another covered with a resistive sensing conductor, the conductor extending only within the region of connected flow over the transducer. The resistive sensing conductors can be of metal film or resistive material which exhibits a change in its electrical resistance as a function of temperature. In one embodiment, the substrate consists of a pair of circular cylindrical members with a resistive sensing conductor extending from the stagnation region within the area of connected flow. In another embodiment, the substrate is a single cylindrical member with two regions having the resistive sensing conductor. In yet another embodiment of the invention, the substrate is a rectangular cylindrical member having a resistive sensing conductor on two opposing faces. Electronic circuitry for both analog control and readout and digital control and readout of the resistive sensing conductors of the present invention is also disclosed.

5 Claims, 6 Drawing Sheets

DIRECTIONAL THERMAL ANEMOMETER TRANSDUCER

TECHNICAL FIELD

This invention relates generally to an improved thermal anemometer sensing apparatus for determining the motion of a fluid mass which surrounds the transducer or, conversely, motion of the transducer through the fluid. The invention is particularly concerned with a directional heat loss anemometer transducer for sensing fluid properties and both the speed and direction of motion of a fluid, as a liquid or a gas, in which the transducer is immersed. The invention is also concerned with both analog and digital means for transducer excitation and operation and transducer signal readout.

BACKGROUND ART

The use of hot wires and hot films as anemometer transducers is well known in the prior art. In such devices, a heated resistance element serves as a sensing element and its geometry is used to define its spatial response to impinging fluid flow. The sensing element has a non-zero temperature coefficient of resistance and is maintained at constant resistance and, thus, temperature. Examples of prior art heat loss anemometer transducers, thermal anemometer sensors, and operating circuits therefor, are shown in U.S. Pat. Nos. 3,363,462, 3,352,154, 3,604,261, 3,677,085, 3,900,819, 4,024,761, 4,206,638, 4,279,147 and 4,549,433.

U.S. Pat. Nos. 3,352,154 and 3,677,085 describe radial transducers with strips or wires placed on a cylinder or round edge of a transducer. Referring to U.S. Pat. No. 3,352,154, narrow direction sensing strips are shown parallel to the axis of a cylinder where the strips are within the stagnation region of the cylinder. Such a mounting location is not at all usable in a transducer subjected to an impinging flow vector which shifts along the axial dimension of the transducer geometry. Elongated thin film strips or wires are useful in radial flow but not in axial flow. U.S. Pat. No. 3,677,085 describes imbedded wires, strips and films which are widely separated in pairs on a body having an aspect ratio, body width to body thickness, of almost 3 to 1. The described tandem flow meter geometry is structured for use in a bounded duct or pipe having constrained radial flow against the transducer and not unbounded free flow. We are taught by the specification that an effort is made to conceal each of the sensing elements from flow over the supporting body by the presence of the body itself in acting as a barrier.

U.S. Pat. No. 3,604,261 describes wide segmented cylindrically supported sensing films in a transducer geometry which is designed for impinging radial flow wherein heat transfer distributional change is relied on for direction sensing with part of the sensing surface falling in the turbulent lee behind the supporting cylinder dynamic separation points.

Prior art thermal anemometer transducers, which use no moving parts, have characteristically had some degree of difficulty in realizing a desired close conformity to the "ideal" cosine characteristic together with a smooth and continuous transition from one direction to the opposite direction of flow. The use of electrical "dither" signals and artificial "lobe switching" from side-to-side has helped to reduce axis crossing irregularities. U.S. Pat. Nos. 4,206,638 and 4,279,147 teach us that further improvement has been brought about by the use of a self-induced turbulent wake as a naturally occurring "aerodynamic dither" signal in the axis crossing regions. U.S. Pat. No. 4,549,433, although not describing a thermal anemometer, teaches us how to mount individual flat plate supported sensing elements in a non-stressed manner.

The present invention provides a significant improvement in the angular response or azimuth response of the thermal anemometer transducer together with improvement in the perceived signal-to-noise ratio or effective signal output with respect to transducer heating power input, together with improved control and readout means therefor.

SUMMARY OF THE INVENTION

The directional thermal anemometer transducer according to the present invention includes an electrically nonconducting substrate having at least two areas substantially thermally isolated from one another and covered with a resistive sensing conductor, the conductor extending only within the region of connected flow. Embodiments are disclosed in which the substrate includes a pair of circular cylindrical elements, each of which has a resistive sensing conductor covering only the region of connected flow. Another embodiment utilizes a single circular cylindrical substrate. Another important embodiment utilizes a rectangular cylindrical substrate with resistive sensing conductors on two opposing surfaces. A further embodiment employs one or more bars which are positioned above or above and below the transducer elements to both support and protect them and also provide self-generated aerodynamic turbulence or dither for improvement of low angle response to incident fluid flow. Analog and digital circuitry is also disclosed for operating the resistive sensing conductors and providing useful output signals.

In one important aspect of the invention, plates mounted at either end of the transducer produce turbulence which flows over the resistive sensing conductors and serves to introduce an aerodynamic dither signal to enhance sensor operation for incident flow nearly parallel to the axis of the transducer.

BEST MODE OF CARRYING OUT THE INVENTION

Figures 1, 2, 3, 4:
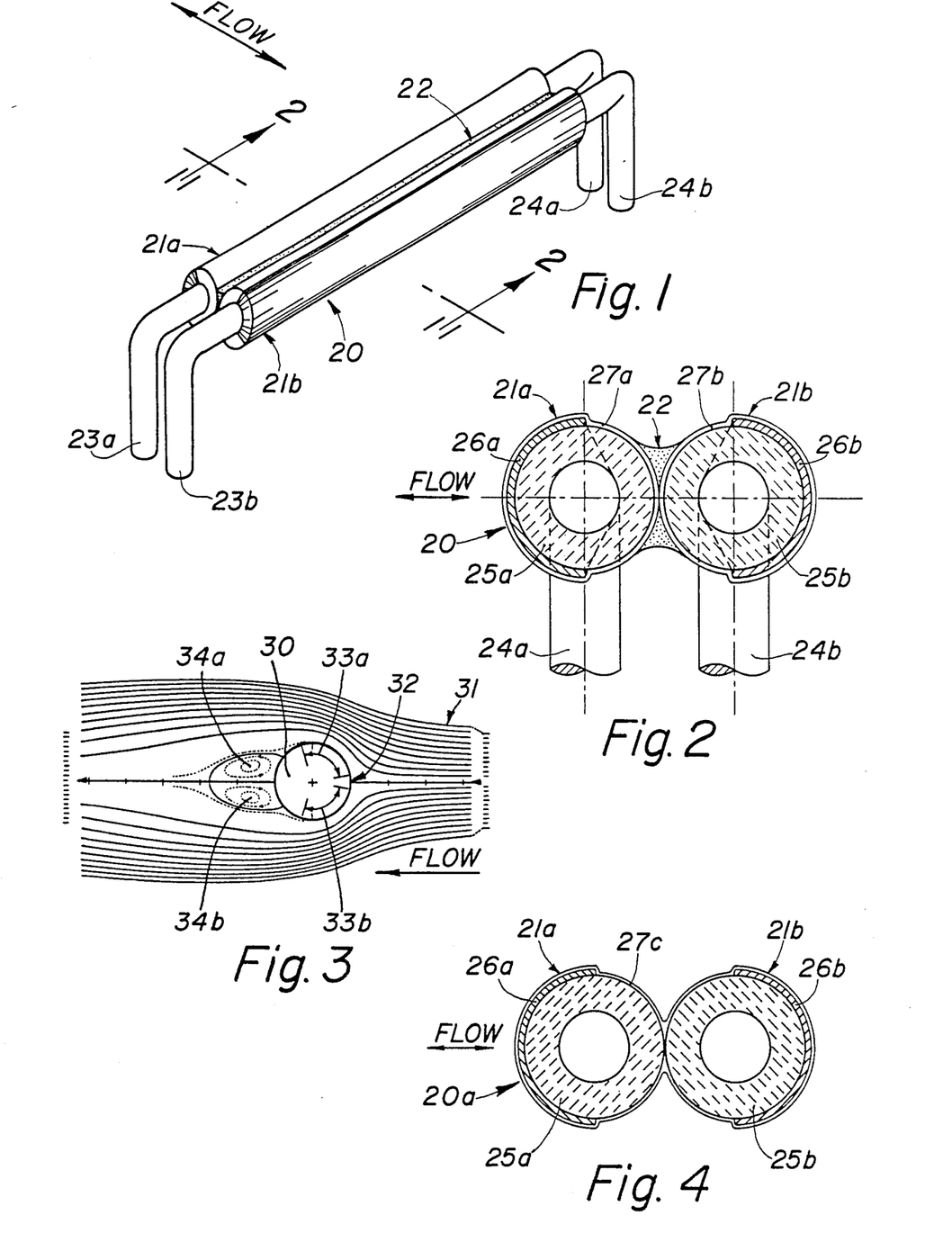
FIG. 1 is a perspective view of a directional thermal anemometer transducer made in accordance with the principles of the present invention.
FIG. 2 is an elevational section view of the directional thermal anemometer transducer structure illustrated in FIG. 1, taken along the line 2—2 thereof, and looking in the direction of the arrows.
FIG. 3 is a diagrammatic view of the flow stream past a circular cylinder at low speed with the velocity of the fluid flowing normal to the axis of the cylinder.
FIG. 4 is a cross-section view of the transducer, similar to FIG. 2, illustrating a second embodiment wherein the sensing element supporting substrate pair is rigidly joined together.

Referring now to the drawings, and in particular to FIG. 1, the numeral 20 generally designates a directional thermal anemometer transducer constructed in accordance with the principles of the present invention. The transducer 20 includes two cylindrical, parallel sensing elements or members, generally indicated by the numerals 21a and 21b, which are resistive sensing elements whose lengths are substantially greater than their diameters. Typically, the sensing members 21a and 21b may have an outside diameter of 0.6 mm, with an overall length of 25 mm, thereby having a length to diameter ratio of almost 42 to 1. As shown in FIGS. 1 and 2, the elements 21a and 21b are physically separate from each other, and they are connected or joined along their length by an adhesive or other connecting means 22 although they may only be connected to each other at each end provided that no open fluid flow passage is permitted to exist between the elements 21a and 21b. The sensing elements 21a and 21b are similar in construction and it is to be desired that they are as nearly identical as possible.

The bodies of the sensing elements 21a and 21b have electrical connecting wires 23a and 23b, respectively, and electrical connecting wires 24a and 24b, respectively, at the other end thereof. The bodies of the sensing elements 21a and 21b are uniformly covered with a conductive resistive film only on that portion of their surface which is directly exposed to the impinging fluid flow stream. The connecting lead wires 23a, 23b, 24a and 24b are made of similar material in order to avoid unwanted thermocouple junction effects, and thereby help to produce the lowest possible intrinsic electrical noise level of the transducer 20 together with maximum long term stability. The material usually used is platinum metal and this specification will describe its preferred use throughout although other materials such as nickel can be used. Alternative materials which may be used for the sensing elements 21a and 21b are described in U.S. Pat. No. 3,352,154.

In order to attain the greatest mechanical strength and integrity of the sensing element to lead wire bond the lead wires 23a, 23b, 24a and 24b are all fitted to the same insertion depth into the central bore of the hollow cylindrical sensing elements 21a and 21b and are fused into place by means of a high temperature vitreous glass-like material such as borosilicate glass used by the thick film circuit industry. An example of such material is Engelhard Industries A-3025 thick film overglaze which is fired in air at 900° C. Careful control of lead wire insertion into the sensing element is required so that the thermal mass distribution of the entire sensing element is as near identical as possible from end to end and from unit to unit for each sensing element 21a and 21b in order to assure repeatable dynamic thermal heat loss characteristics. The resistive film is applied to the sensing elements 21a and 21b after the lead wires 23a, 24a, 23b and 24b are fused or bonded into place. The applied resistance film overlaps the sensing element body 21a and 21b and lead wires 23a, 24a, 23b and 24b thereby providing a reliable electrical connection. The transducer 20 may be physically supported by its lead wire pairs 23a, 23b and 24a, 24b. Typically, lead wire 23 and 24 diameter may be 0,25 mm and they may be bent and formed to suit mounting needs.

The directional thermal anemometer transducer 20 is structured to be principally responsive to fluid flow across transducer 20 within the plane which is defined by and contains the two parallel axes of sensing elements 21a and 21b. Response is at maximum for flow across transducer 20, perpendicular to sensing elements 21a and 21b and response is at a minimum for parallel flow or flow along the length of sensing elements 21a and 21b. By use of appropriate excitation and readout means both incident fluid speed and the sign of fluid flow direction can be readily determined. Little variation in sensitivity may be observed for incident flow which moves out of the plane defined by the sensing element 21a and 21b axes. This is but one of the reasons why transducer 20 may be applied in plural fashion to cartesian measurement of wind speed and direction in meteorological applications and three such transducers, 20, can be oriented so as to be responsive to three-dimensional flow through nearly 360 spherical degrees. When mounted on shipboard, for example, an instrument using transducer 20 singly or in orthogonal pairs, horizontally oriented, exhibits useful and accurate response even during conditions of extreme pitch and roll.

It can be argued that the "ideal" directional sensing element is a single coherent element which thereby removes all problems of matching and balancing element pairs, trimming, and the like. This is difficult to achieve, if not quite possible, since two discrete sensing devices are required to sense sign change together with speed. Two such devices cannot occupy the same volume. A useful compromise is to join a pair of sensing elements on a single common cylindrical substrate where they are minimally separated. The closer the elements are to each other, but avoiding thermal interaction, the better will be their overall directional conformance to an ideal cosine for the widest range of speeds. Thermal losses from one element to the opposing element will tend to degrade signal-to-noise levels since the thermal losses are wasted heating power, not contributing to the perception of incident flow induced heat transfer to the flowing stream.

FIG. 2 is an elevational section view of the directional thermal anemometer transducer 20 structure illustrated in FIG. 1, taken along the line 2—2 thereof, and looking in the direction of the arrows. The sensing element 21a consists of an electrically non-conductive, hollow, tubular, dense aluminum oxide refractory fine cylindrical substrate body 25a. Upon a portion of the substrate 25a surface there is deposited a resistance film or coating of platinum metal 26a. The supporting substrate body 25a may be chosen from other suitable materials that are electrically non-conductive, such as quartz, hard glass, mullite, aluminum silicate and other refractory materials. The several substrate shapes herein described can be obtained from Degussa Corp. as single-bore and multi-bore fine tubes of aluminum oxide, aluminum silicate and similar refractories in a wide range of sizes from their standard catalogue inventory. When low operating and fabrication temperatures are to be encountered in film 26a deposition and use, as in certain vacuum evaporative coating methods, the substrate 25a can be made of soft glass or even plastic tubing. The resistive film coating 26a has a further layer 27a of vitreous enamel, glass overglaze, fused silica, silicone varnish, a plastic such as "TEFLON" (a trademark), or other protective coating material which provides abrasion and wear protection for the resistive film 26a. It is important that the material which is chosen for protective coating 27a is stable and does not change with time and extended exposure to the intended environment for the transducer 20. An example of an inert vitreous overglaze which is compatible with both platinum metal and aluminum oxide is Engelhard Industries #6624 squeegee overglaze which is fired at 625° C. The protective layer 27a can be applied over the entire outer surface of the sensing element body 21a by dipping, brushing or spraying or it may be limited only to the area covered by resistive film 26a without adverse effect on performance or longevity. The protective layer 27a thickness is usually less than 0.025 mm thick and most often it is used in the range of 0.006 mm thick after firing. The protective layer 27a is extended to include the area where resistive platinum film 26a overlaps platinum lead wires 24a and 23a thereby protecting the electrical connection at both ends of sensing element body 21a. Typical dimensions for the substrate body 25a are a cylinder diameter of 0.6 mm, with a bore diameter of 0,3 mm, and a length of some 25 or 30 mm. The entire sensing element 21a can be scaled larger in size or considerably smaller as the intended application may require. The thickness of the resistive film or metal film 26a is typically in the order of 2 to 10 microns with an electrical resistance of several ohms. It can vary in accordance with the particular coating method which is selected. Several different coating methods may be used and if vacuum sputtering facilities are available they can be used to deposit platinum or other metal film 26a on the substrate 25a and lead wire 23a and 24a assembly by lining up a number of assemblies side-by-side so that they are touching each other along their length. In this manner the resistive film can be placed on about 180 degrees of circumferential coverage around substrate 25a. When sputtering techniques are used the film 26a will be thickest where it is closest to the sputtering source and it will be thinnest and have highest resistance along the edges, away from the source. A less costly method for film 26a application is to borrow from the ancient methods used by the printing trade or by the newer thick film micro-circuit industry and use platinum paste as if it is printer's ink.

An example of platinum paste is Engelhard Industries #6082 or #6926 which may be fired at 800° to 850° C., less than the lead wire attachment bonding temperature of 900° C. Platinum paste can be squeegeed onto a polished metal or glass plate and a soft rubber roller may be used to roll transfer the platinum paste to the substrate 25a by rolling along its axial length. The coverage angle of film 26a over the surface of the fine cylinder 25a can be controlled by rubber roller hardness and the contact pressure which is applied. A soft rubber with higher contact pressure can produce wider coverage angles, in the 120 to 180° plus range, while lower contact pressures can restrict the angle of coverage to 90° or even less. After application of platinum paste the element is fired in accordance with the manufacturer's specifications for their material. A rolled thick film will be thinnest at the center portion and thickest at its edges. Similarly, the protective overglaze 27a may be applied by roll transfer techniques. It is desired that the film 26a firing temperature is within the refiring range of the high temperature overglaze material which was used to secure the lead wires 23a and 24a into the substrate body 25a. A further discussion of sensing element materials, construction, use and application may be found in U.S. Pat. Nos. 4,206,638 and 4,279,147.

The sensing element 21b is constructed the same as 21a, and the same reference numerals have been used followed by the small letter "b".

As best seen in FIG. 2, cross flow between the sensing elements 21a and 21b is prevented by the sensing elements themselves or by use of a connecting material 22 which also serves to hold sensing elements 21a and 21b in mechanical alignment. If the connecting material 22 is sufficiently strong and stable it may be applied only at each end of the sensing element pair 21a and 21b since cross flow between the sensing elements 21a and 21b is prevented by tangent contact of the cylinders along their length providing no path for cross flow. Accordingly, a small drop or smidgen of cyanoacrylate adhesive 22, such as Eastman 910, may be applied between each end of the sensing element pair 21a and 21b. When adhesive is applied only at each end, repair or replacement of a single element can be easily effected in the event of damage. The connecting material 22 can be dissolved by a suitable solvent or, if a semi-flexible material is used, sliced by a very thin razor blade. Material for the connection 22 can also be a semi-flexible adhesive material such as Dow-Corning silicone resin, silicone varnish, silicone rubber adhesive or a more rigid epoxy resin. It should be noted that the heated sensing films 26a and 26b are on the outside of the transducer 20, away from any direct contact with connection 22. This construction minimizes or removes any effect that variability of the connecting material 22 with time and environmental exposure might have on the performance of sensing elements 21a and 21b. It also lessens the need to precisely apply the same amount of connecting adhesive material 22 to each transducer 20 pair of sensing elements 21a and 21b.

Typically, resistance of the platinum films 26a and 26b for a transducer 20 of the scale indicated by the above, is in the 2 ohm to 6 ohm resistance range at room temperature. Optimum film resistance is best determined by the characteristics of the associated electronic controller which is used to excite the transducer 20, and such factors as available power supply source, types of amplifier used, operating method selected, working fluid, and the like, are all within the control of the instrument designer.

A large ratio of sensing element 21a and 21b length to element diameter will produce angular sensitivity to fluid flow or airflow as the flow vector moves away from normal flow which is perpendicular to the cylindrical axes of sensing elements 21a and 21b as impinging flow varies through 360 degrees in the plane contained by the parallel axes of sensing elements 21a and 21b. Direction sign sense can be determined by electrical measurement of the change in relative resistance values of each sensing element 21a and 21b when they are compared with each other in a balanced bridge circuit or it can be determined by comparing the power dissipated by each sensing element 21a or 21b with respect to its neighbor when each is operated separately at constant temperature. Fluid speed is determined by measurement of the magnitude of the balanced bridge circuit differential output signal which follows an approximate fourth root relationship to a speed increase, or, fluid speed may be determined by measuring the power which is dissipated by each sensing element 21a or 21b when each is operated at constant temperature.

FIG. 3 is a diagrammatic view of low speed flow stream lines 31 past a right circular cylinder 30 with the velocity of the fluid flowing normal to the axis of the cylinder 30. Laminar or non-turbulent flow is shown. The view illustrates a cross section of cylinder 30 with indicated flow from right to left, first impinging on cylinder 30 at point 32. Point 32 is defined as the forward stagnation point and may be more correctly described as the stagnation region if the flow stream contains the least amount of turbulence. Relative velocity at the stagnation point 32 is always zero, regardless of stream 31 velocity. The stagnation point 32, where stream division around the cylinder 30 occurs, is not uniquely defined at a specific point unless the fluid stream contains zero turbulence and, since this is not possible, it is therefore more correctly defined as the stagnation region, again 32. Flow continues around the cylinder surfaces 33a and 33b and separates away from the cylinder 30 at about 108.8° away from the stagnation point 32 for low speeds. The area behind cylinder 30 contains two turbulent vortices 34a and 34b whose size and intensity depends on flow velocity among other factors. Referring to FIG. 2, a sensing film 26a on sensing element 21a which extends beyond the region of connected flow, 33a and 33b of FIG. 3, tends to decrease the perceived signal as a function of stream flow. A transducer element may be fabricated to optimize its performance by not extending the active sensing region beyond the region of connected flow. Advantage may be taken of the stagnation region 32 if it is desired, for example, to segment or split the sensing film along the axis of the supporting cylinder in order to fabricate a cantilever or single-ended transducer structure having both film lead wire connections at one end as a result of the doubled back film. The segment of removed film is simply located in the stagnation region 32.

A discussion of fluid flow around a cylinder can be found on pages 21 through 26 and 59 through 65 of a book entitled "Modern Developments in Fluid Dynamics", Vol. 1, edited by S. Goldstein, published in 1965 by Dover Publications, Inc., New York, N.Y.

FIG. 4 illustrates a cross-section view of a second embodiment of a directional thermal anemometer transducer 20a, similar in all respects but one to the FIG. 2 cross-section of transducer 20. Materials and fabrication methods are the same. The single difference is that the substrate bodies 25a and 25b are tangent, touching along their axial length, and the protective overglaze 27c covers the entire pair of sensing elements 21a and 21b thereby rigidly joining them together along their length. When an inert overglaze, such as Engelhard #6624, is used the resulting bond will be invariant for the life of transducer 20a and long term stability is enhanced. Connecting material 22 of FIGS. 1 and 2 is not used as it is not needed. Sensing element 21a is effectively isolated thermally from sensing element 21b by placing substrate 25a and 25b wall thickness paths, through adjoining protective coating 27c at the point of tangency, between sensing elements 21a and 21b.

Figures 5, 6, 7, 8, 9:
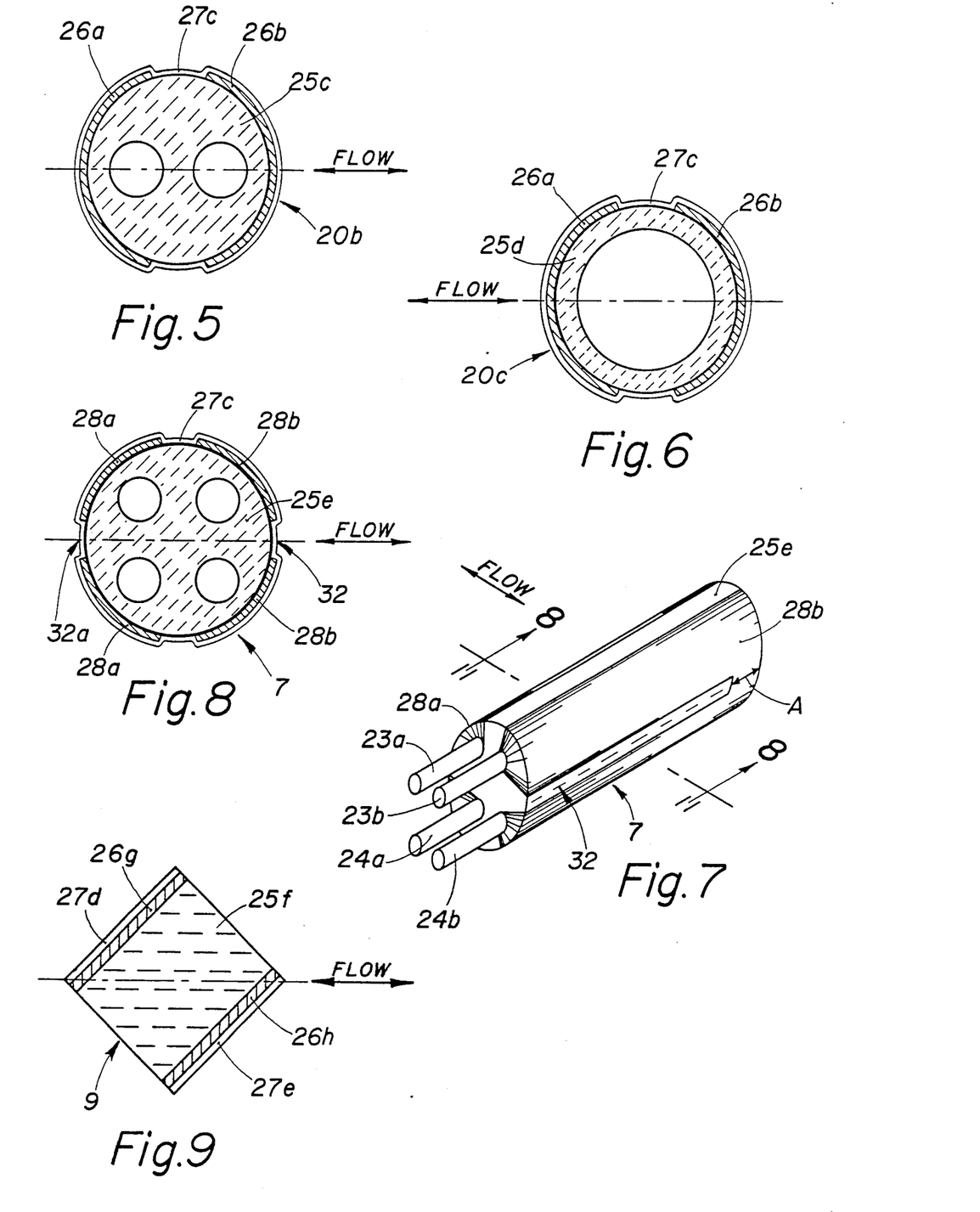
FIG. 5 is a cross-section view of the transducer, similar to FIG. 2, illustrating a third embodiment wherein the sensing element pair is supported on a single round cylindrical substrate.
FIG. 6 is a cross-section view of the transducer, similar to FIG. 5, wherein the sensing element pair is supported on a single hollow cylindrical substrate.
FIG. 7 is a perspective view of a fourth embodiment of a directional thermal anemometer transducer made in accordance with the principles of the present invention.
FIG. 8 is an elevational section view of the directional thermal anemometer transducer structure illustrated in FIG. 7, taken along the line 8—8 thereof, and looking in the direction of the arrows.
FIG. 9 is a cross-section view of a fifth embodiment of the transducer, similar to FIG. 5, wherein the sensing element pair is supported on opposite faces of a single rectangular cylindrical substrate.

FIG. 5 illustrates a cross-section view of a third embodiment of a directional thermal anemometer transducer 20b wherein the pair of resistive films 26a and 26b are deposited upon a single double-bored substrate 25c. The entire transducer 20b is covered by a protective coating 27c. Fabrication materials and methods are as described for the FIGS. 1 and 2 transducer 20 although it will be useful to consider a substrate 25c material which has a lower thermal conductivity than aluminum oxide where a single substrate is used to support two films 26a and 26b in a closely positioned pair, in order to reduce thermal linkage through the substrate 25c. A particularly attractive material to consider is mullite porcelain, a combination of aluminum oxide, silicon dioxide, magnesium oxide and magnesium dioxide, which has a thermal conductivity one tenth that of aluminum oxide at 100° C. As above, the substrate bore can be used to facilitate lead wire attachment. The use of two closely spaced films 26a and 26b on a single cylindrical substrate 25c approaches an "ideal" single coherent transducer structure where it is desired that a single physical device serves to accomplish more than one sensing or transducing function with the least disturbed volume presence in the flow stream.

FIG. 6 illustrates a cross-section view of a transducer 20c which is similar to FIG. 5. Transducer 20c uses a single hollow tubular substrate 25d upon which are deposited two sensing films 26a and 26b, both covered with a protective coating 27c. When a hollow cylinder 25d is used as the supporting substrate, minimum thermal mass for the transducer 20c itself can be realized and here, again, mullite porcelain is to be considered for its low thermal conductivity. Mullite has substantially lower strength than aluminum oxide although it is by no means a weak or marginal material for transducer substrate 25d applications. Lead wires may be attached by soldering or by other means to the outside ends of each film 26a and 26b where the protective coating 27c can be omitted in a small area.

FIG. 7 is a perspective view of a fourth embodiment of a directional thermal anemometer transducer 7 made in accordance with the principles of the present invention. In this configuration the sensing films 28a and 28b are, figuratively, folded-back upon themselves in order to facilitate a cantilever or single-ended construction. Cantilever construction is particularly useful when, for example, three such structures are orthogonally oriented with respect to each other forming a geometric array which is capable of measuring three components of fluid flow. When three transducers 7 are mounted by their lead wires 23a, 24a, 23b and 24b to a physically small supporting structure or sting, they may be arranged in the form of the edges of the frustum of a pyramid which has no outboard lead wires to disturb the flow field. A four bore cylindrical substrate 25e is used to support films 28a and 28b which are both split or separated down their center portion for a majority of their length along the stagnation region 32 referred to in the discussion of FIG. 3. The film 28b is left intact at area A so that an electrical current path is provided between the segmented film 28b halves. Lead wires 23a, 23b, 24a and 24b are attached to the substrate 25e in the manner described for the FIGS. 1 and 2 transducer 20. The segment of missing film shown at 32 for film 28b may be produced by placing a thin fiber of aluminum oxide rod or quartz rod over the substrate 25e as a shadow mask if a vacuum sputtering coating process is used. Alternatively, already deposited film may be removed by means of a laser beam or abrasive cutting technique.

FIG. 8 is an elevational section view of the directional thermal anemometer transducer structure 7 illustrated in FIG. 7, taken along the line 8—8 thereof, and looking in the direction of the arrows. Segmented sensing element pairs 28a and 28b are each separated from the other and are deposited on substrate 25e with missing segments 32 and 32a for films 28b and 28a, respectively. Segment 32 and 32a significance is pointed out in the description of FIG. 7. Protective coating 27c is applied over the entire transducer 7 and the lead wire 23a and 24a, 23b and 24b attachment areas to films 28a and 28b, respectively.

FIG. 9 is a cross-section of a fifth embodiment of the transducer 9, similar to FIG. 5, wherein the sensing element pair 26g and 26h is supported on opposite faces of a single rectangular cylindrical substrate 25f. Each film 26g and 26h face is covered by a protective coating 27d and 27e, respectively. When a rectangular cross-section transducer 9 is subjected to cross flow against an edge, division of the flow forcibly takes place at the sharp edge and there is no stagnation region of indeterminate or zero flow. Flow separation takes place always at the top and bottom edges of the rectangle. The flow field is rigorously defined by the geometry of a fixed parallelogram rather than the geometry of a circle. Fabrication of transducer 9 differs from that used for round cylindrical transducers. A flat plate substrate of aluminum oxide or similar refractory material is used to make many sensing element pairs at the same time by silk screening platinum paste on both sides of the plate and firing it in a conveyor furnace, periodic furnace or in a kiln. A protective overglaze coating is silk screened over the fired platinum film, leaving end zones uncovered for lead wire attachment by soldering or similar means. Aluminum oxide plates, typically 25.4 mm by 25.4 mm by 0.635 mm (1"×1"×0.025"), may be obtained from TDK Corp., Coors Porcelain Co. and many others. After firing, the plates can be slit to the desired width, say 0.635 mm, providing a nearly square cross-section cylinder, transducer 9. Slitting is customarily done by use of ganged diamond saws. This method provides for great uniformity between transducers cut from the same plate. It is desired to match the films on both sides of the plate as closely as possible.

Figures 10, 11, 12:
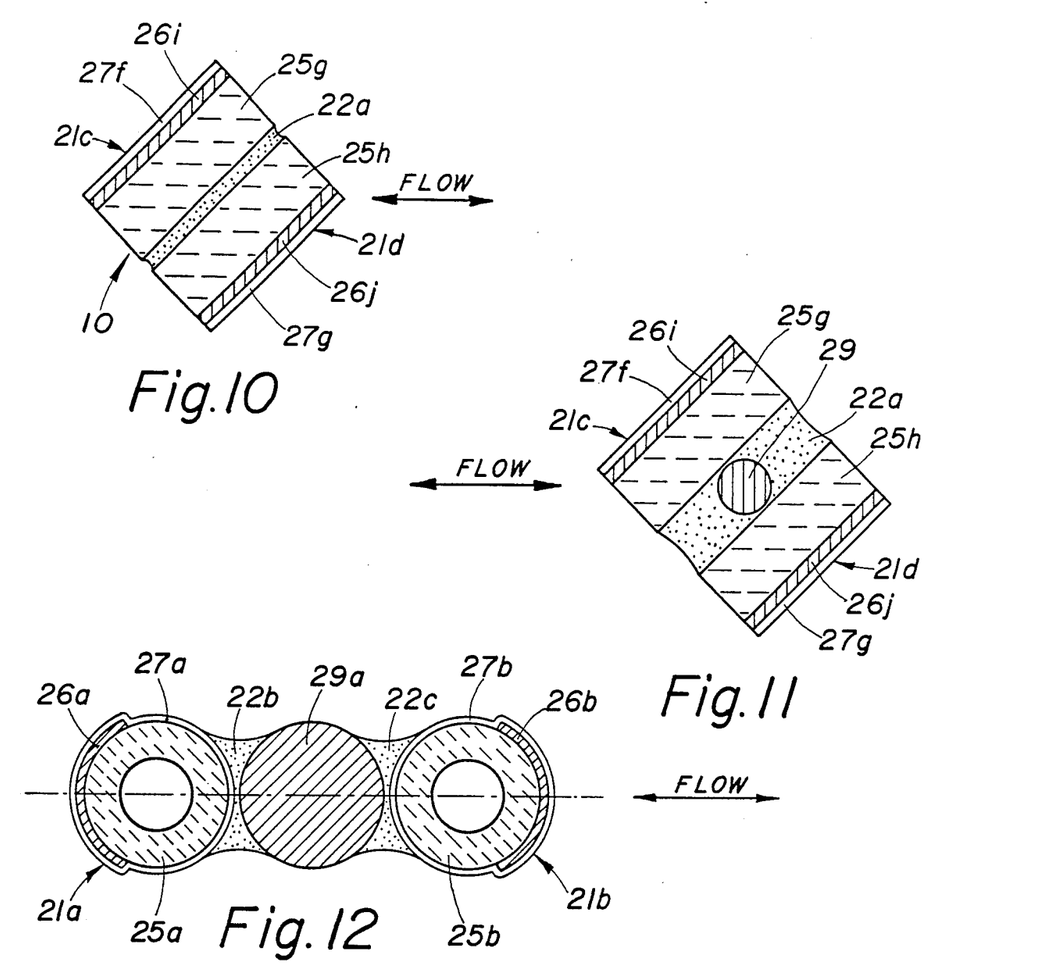
FIG. 10 is a cross-section view of the transducer, similar to FIG. 9, wherein a sensing element is supported on a flat plate substrate which is adhesively joined to the rear face of an identical flat plate substrate supported sensing element, both plates thereby forming a rectangular cross-section.
FIG. 11 illustrates a cross-section view of a sixth embodiment of the transducer, similar to FIG. 10, wherein the two flat plate supported sensing elements are mounted on either side of a central support bar.
FIG. 12 illustrates a cross-section view of a further embodiment of the transducer of FIG. 11 wherein the element pair shown in FIG. 2 is separated and mounted on either side of a central support bar.

FIG. 10 is a cross-section view of the transducer 10, similar to FIGS. 5 and 9, wherein the sensing element pair 21c and 21d is supported on opposite faces of a single composite rectangular cylindrical substrate, formed of two separate substrates 25g and 25h which are cemented or bonded together 22a. Each film 26i and 26j is protected against wear and abrasion by a coating 27f and 27g, respectively. The bonding material 22a can be semi-flexible or rigid as described for FIGS. 1, 2 and 4. This configuration can be less costly than the FIG. 9 configuration because substrate 25 plates are coated on only one side before slicing them to size. Fabrication is similar to that for the FIG. 9 transducer. When the plates are single-sided, adjacent pairs can be chosen for elements 21c and 21d, arriving at a near perfect match of physical and electrical characteristics. Electrical lead wire connections are made to each end of elements 21c and 21d as was done in transducer 9 of FIG. 9.

FIG. 11 illustrates a cross-section view of a sixth embodiment of the transducer, similar to FIG. 10, wherein the two flat plate supported sensing elements 21c and 21d, of FIG. 10, are mounted on either side of a central support bar 29. The axial central support bar 29 can be used to mount and position the transducer of FIG. 11 in other mechanical structures. A semi-flexible adhesive material 22a, such as silicone rubber adhesive or epoxy resin can be used to bond the metal support 29 to the ceramic substrate plates 25g and 25h. Electrical lead wire connections are made to each end of elements 21c and 21d as in the transducers 9 and 10 of FIGS. 9 and 10, respectively.

FIG. 12 illustrates a cross-section view of a further embodiment of the transducer of FIG. 11 wherein the sensing element pair 21a and 21b, shown in FIG. 2, is separated and mounted on either side of a central support bar 29a. The axial central support bar 29a can be used to mount and position the transducer of FIG. 12 in other mechanical structures and also strengthen the sensing element pair 21a and 21b by supporting them along their length. A semi-flexible adhesive material 22b and 22c, such has silicone rubber adhesive or epoxy resin, can be used to bond the metal supporting bar 29a to the transducer sensing elements 21a and 21b. Electrical lead wire connections are made to each end of the elements 21a and 21b as was described for similar elements used in FIGS. 1 and 2. It will be noted that the sensing films 26a and 26b are shown covering about 150 to 180 degrees of supporting substrate cylinders 25a and 25b, respectively, and that each sensing element 21a and 21b is covered with a protective coating 27a and 27b, respectively. U.S. Pat. No. 4,024,761 teaches us that a directional hot film anemometer transducer can be made using two cylindrically supported sensing films which completely surround their supporting substrates and the two cylindrical sensing elements are supported on either side of an axially central supporting bar. It should be noted that considerable sensing element heating power in the U.S. Pat. No. 4,024,761 transducer is wasted, heating the central support, and that a large portion of the sensing film is covered by the material which is used to connect the sensing elements to the supporting bar, adversely reducing the transducer's sensitivity to incident flow and significantly reducing the transducer's signal-to-noise ratio.

Figure 13:
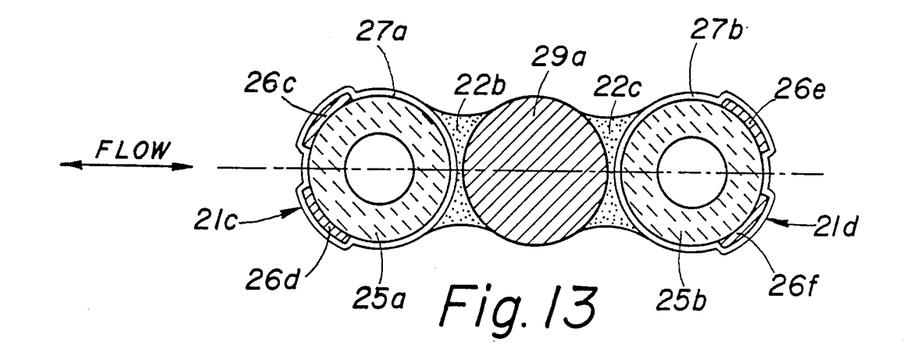
FIG. 13 is a cross-section view of yet a further embodiment of the transducer of FIGS. 2 and 12 wherein each element of the pair shown in FIG. 12 is formed of two sensing elements on the same cylindrical substrate.

FIG. 13 is a cross-section view of yet a further embodiment of the transducer of FIGS. 2 and 12 wherein each element 21a and 21b of the pair shown in FIG. 12 is formed of two sensing elements 26c with 26d and 26e with 26f on the same cylindrical substrate 25a and 25b, respectively. Sensing elements 21c and 21d use segmented films 26c with 26d and 26e with 26f, respectively, in the manner described for the FIGS. 7 and 8 transducer 7. Each element 21c and 21d is separated and mounted on either side of a central support bar 29a which can be mechanically supported from one end, facilitating cantilever construction and mounting if desired. An adhesive bonding material 22b and 22c is used to join sensing elements 21c and 21d to support bar 29a. Construction is similar to that described for the FIG. 12 transducer. Substrate 25a and 25b can be either single-bore or multi-bore refractory cylindrical tubing. Electrical connecting lead wires may be attached either within the substrate bore or on the external surface of the sensing films 26c, 26d, 26e and 26f as above described.

Figure 14:
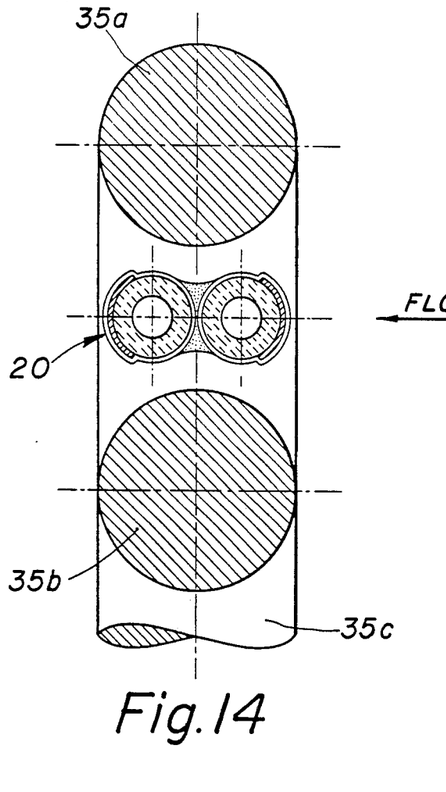
FIG. 14 illustrates a seventh embodiment of the transducer of FIG. 1 wherein the sensing element pair is centrally mounted between two parallel support bars.

FIG. 14 illustrates a seventh embodiment of the transducer 20 of FIG. 1 wherein the sensing element pair 21a and 21b is centrally mounted between two parallel support bars 35a and 35b. Support bar 35a is bent downward 35c in an inverted "U" shape to facilitate the mounting and support of transducer 20, with its connecting lead wires, and lower support bar 35b which is joined to support bar 35c. The parallel support bars 35a and 35b contribute both mechanical protection and, together with bar 35c and its mirror image at the opposite end of transducer 20, exert an aerodynamic influence on the performance of transducer 20 when it is used in airflow as a wind direction transducer. U.S. Pat. No. 4,206,638 teaches us the use of a single bar over sensing elements and introduces us to the concept of self-induced "aerodynamic dither" to improve low angle, nearly parallel, performance of a directional heat loss anemometer transducer thereby improving axis crossings or the region where incident wind changes direction sign from plus to minus, north to south, for example, U.S. Pat. No. 4,279,147 teaches us to use a second bar in order to arrive at symmetry of flow over the element pair placed between two bars of a directional heat loss anemometer transducer support structure and the described element pair uses sensing films which completely surround a tubular cylindrical substrate. The FIG. 14 structure combines the features of the herein described transducer 20 of FIGS. 1, 2, 4, 5 and 6, with the advantages to be gained by mounting it between the double bar described by U.S. Pat. No. 4,279,147, all of which results in a marked improvement in wind transducer performance.

Figure 15:
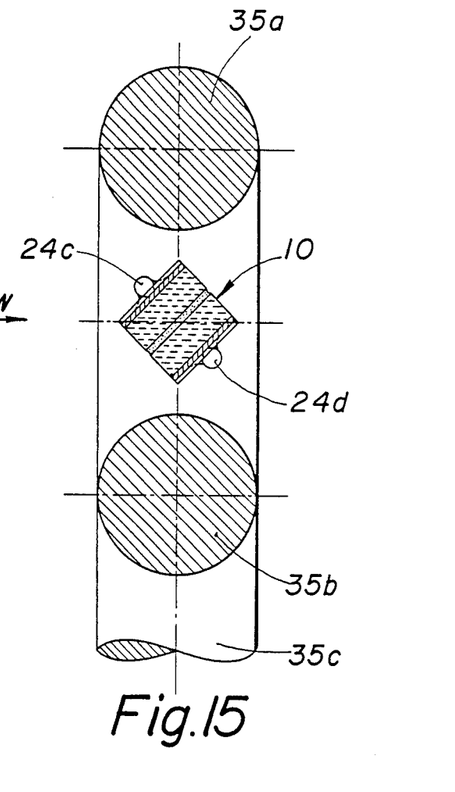
FIG. 15 is a cross-section view of a transducer similar to FIG. 14 wherein the sensing element pair of FIG. 10 is shown centrally mounted between two parallel support bars.

FIG. 15 is a cross-section view of a transducer structure similar to FIG. 14 wherein the transducer 10 is centrally mounted between two parallel support bars 35a and 35b as in FIG. 14. Electrical connecting lead wires 24c and 24d are shown connected to the surface at one end of transducer 10, as they may appear in a view of the structure, passing into support bar 35c vertical portion. The transducers of FIGS. 9 and 11 can be similarly combined with the double bar of FIG. 15 in order to gain added mechanical protection together with improved aerodynamic performance.

Figure 16:
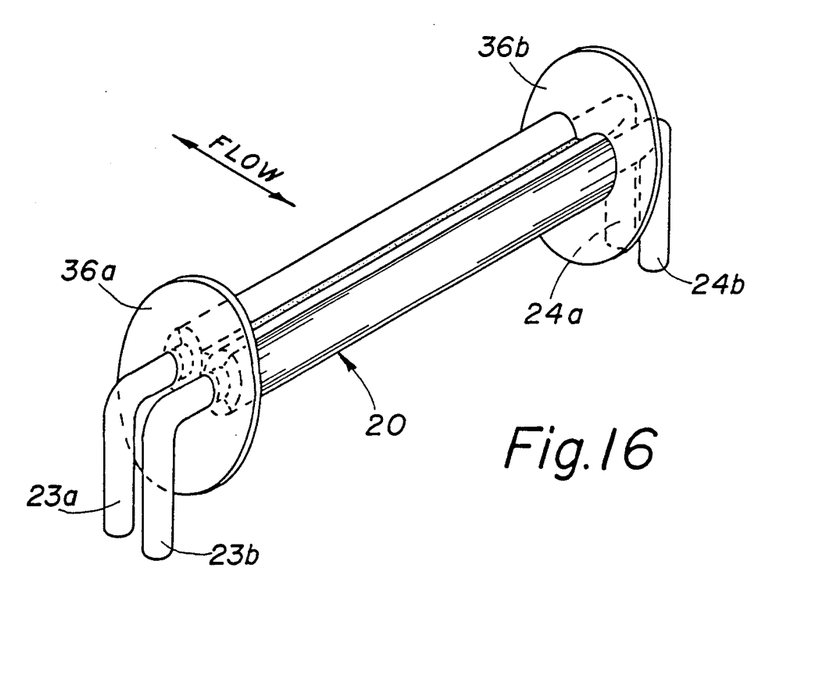
FIG. 16 is a perspective view of an eighth embodiment of the transducer of FIG. 1 wherein a flow obstructive plate is mounted at each end of the transducer and across the sensing element pair.

FIG. 16 is a perspective view of an eighth embodiment of the transducer 20 of FIG. 1 wherein a flow obstructive barrier 36a and 36b is mounted at each end of the transducer 20, across its sensing elements, perpendicular to the longitudinal axis of transducer 20. The plates 36a and 36b may be supported by the lead wire pairs 23a with 23b and 24a with 24b, respectively, at each end of transducer 20. Plates 36a and 36b should be electrically insulating or, if made of metal, should be insulated from the lead wires 23a, 23b, 24a and 24b. Depending on the length of transducer 20, the plates 36a and 36b may range in size from one to ten times the cross-section width of transducer 20 and they may be round, square or irregularly shaped so long as symmetry is maintained from end to end of transducer 20. The purpose of barriers 36a and 36b is to intentionally introduce a blockage or interference in the path of parallel flow over the transducer 20 in order to create wake turbulence behind plates 36a and 36b, in effect causing what can be termed "aerodynamic dither" or rapid switching from one side to the other for parallel or near parallel flow along the transducer 20 axis. Flow over a portion of the transducer 20 is blocked by the plate 36a and 36b and each pulse in the turbulent vortex wake behind plates 36a and 36b alternates from side to side and flows along the axial length of transducer 20. The effect diminishes in intensity as the flow vector moves away from parallel axis flow to flow perpendicular to the axis of transducer 20. The turbulent vortex condition behind a flat plate is discussed on pages 36 through 41 of the previously cited reference: "Modern Developments in Fluid Mechanics".

Obstructive plates 35a and 35b can similarly be used to advantage when mounted at each end of the cantilever transducer 7 of FIG. 7, and the FIGS. 9, 10, 11, 12 and 13 transducers.

Figure 17:
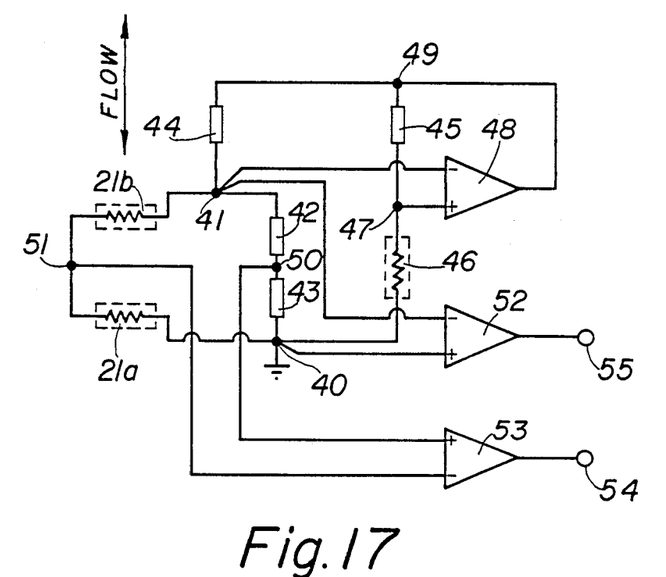
FIG. 17 is a simplified electrical schematic drawing illustrating analog excitation and readout means for a dual sensing element transducer of the type shown in FIG. 1 wherein separate outputs are provided for direction sign sense and flow velocity readout signals.

FIG. 17 is a simplified electrical schematic drawing illustrating analog excitation and readout means for a dual sensing element 21a and 21b transducer of the type shown in FIG. 1 wherein separate outputs are provided for direction sign sense 54 and flow velocity 55 readout signals. The direction sensing pair of elements 21a and 21b is shown connected as two arms of a four arm Wheatstone bridge which is also formed by resistors 42 and 43. The resistors 42 and 43 are used to balance the bridge when the fluid medium surrounding the transducer is at rest or at zero speed. Excitation for the bridge of FIG. 17 is provided at connections 40 and 41, and bridge balance between points 50 and 51 is detected and is amplified by a differential amplifier 53, thereby providing a signal 54 which is a measure of the degree of balance or imbalance of the direction bridge. The signal 54 shows imbalance by swinging to either positive or negative polarity when one or the other of the paired sensing elements 21a or 21b is ventilated at a greater speed. The bridge formed by the resistors 42 and 43, together with the pair of sensing elements 21a and 21b can be considered to be electrically as a single resistor which in turn becomes one arm of a second Wheatstone bridge which is formed by a power resistor 44 in series with the first Wheatstone bridge, or direction bridge, and by resistors 45 and 46 which are used to balance the second bridge at an operating point determined by the values of resistor 45 and 46. Either resistor 45 or 46 can be varied at the time of bridge design or a potentiometer or variable resistor may be used for one or the other, but not both. This allows operator selection of operating point and instrument sensitivity. Amplifier 48 is a differential amplifier having a high current output which is fed back in closed loop fashion to the bridge at point 49. The input to amplifier 48 is taken across the bridge at points 41 and 47, and attention must be paid to phasing, in order to assure that negative feedback is used.

Differential amplifier 52 is connected across the direction bridge at points 40 and 41, and it is used to determine the fluid speed against sensing elements 21a and 21b as if they were a single element. Sensing elements 21a and 21b, together with resistors 42 and 43, appear to amplifier 52 to function as a single resistance source which is sensitive to any variation in its constituent parts. The sensing elements 21a and 21b, are in fact non-zero coefficient resistors, and when platinum metal is used for the film, the temperature coefficient is a high positive value. This fact permits the setting of the values of the resistors 45 and 46 so that the bridge balance resistance values required for bridge balance are satisfied when the total series-parallel resistance of the direction bridge, taken as a single resistance, together with power resistor 44, both balance against resistors 45 and 46 by having the same resistance ratios on either side of the bridge. The active side is comprised of resistor 44 together with the direction bridge. The reference side is comprised of resistors 45 and 46.

When the sensing elements 21a and 21b are cold or are non-operating, their resistance is lower than their operating value, and in controlling their opening value through the setting of the reference resistance ratio, the heated resistance values required to self-balance the bridge can be selected, all of which is controlled through means of negative feedback through amplifier 48 to the bridge at point 49. The feedback loop operates to automatically adjust the current through the total bridge comination until the resistance of sensing elements 21a and 21b attains that value of resistance which balances the bridge. A small offset voltage must be present at the output of amplifier 48 when the circuit is first turned on, and the elements are at ambient temperature, so that the minute bridge current which flows as a result of the offset voltage is sufficient to develop a small error signal between points 41 and 42, thus permitting the circuit to turn itself on to an operating condition. The aforedescribed mode of operation has been described as a constant temperature (constant resistance) method of hot wire or hot film anemometer operation.

In a typical circuit, the resistance of each of the sensing elements 21a and 21b is 3.3 ohms each at room temperature. Precautions must be taken when the temperature sensitive resistor values are to be measured. The power resistor 44 is 2 ohms, and it has a low temperature coefficient of resistance, and adequate physical size, so that self-heating does not cause appreciable change in its nominal resistance value with varying current levels. For the transducer 20 of FIGS. 1 and 2, which is built to the scale indicated by the examples, typical zero speed current levels may be in the 0.1 ampere range, and at maximum flow, current levels could be measured near one ampere for an extreme case. Resistor 45 is 499 ohms and may be a precision film or wire wound resistor. Values of resistors 42 and 43 are 20,000 or 30,000 ohms each, so as to avoid needless loading of the sensing elements 21a and 21b. A value of about 2,245 ohms for resistor 46 will cause the direction bridge total resistance to rise to 9 ohms, thereby balancing the bridge. The resulting surface temperature of sensing elements 21a and 21b will be in the 125 to 135 degree Celsius range. Resistor 46 can be used to temperature compensate the sensing elements 21a and 21b. A platinum resistance temperature detector or a nickel resistance thermometer or similar temperature sensitive resistor can be used in place of a fixed low temperature coefficient resistor 46 in order to track and sense ambient temperature variations and automatically adjust anemometer sensitivity to variations in temperature. Customarily, a series trimming resistor is used to pad or trim down the temperature coefficient of the resistor 46 arm of the bridge to balance the temperature coefficient of resistance of the reference side of the bridge against the temperature coefficient of resistance of the heated sensing elements 21a and 21b. A detailed discussion of this technique is presented in U.S. Pat. No. 3,363,462 and Sabin's design equations are particularly useful for thermal anemometry generally.

Output 54 is bi-polar and indicates which sensing element, 21a or 21b, faces the impinging fluid flow. The sensing element facing the flow will be caused to be lower in resistance than the sensing element away from the flow which will increase in resistance while their total resistance remains constant. The output 55 is unipolar, and it provides a measure of speed which is nonlinear, indicating the amount of heat or power lost to the flowing mass of the fluid stream.

Amplifiers 48, 52 and 53 can be integrated circuit operational amplifiers, which are operated from positive and negative 12 or 15 volt power sources. Fifteen volt operation can produce at least ten volt signal swings at the outputs 54 and 55. When plural FIG. 17 bridge circuits are used, with an array of two or more transducers, proper ground and power supply circuit wiring must be provdied in order to avoid unwanted cross-talk between transducers and a possible resulting failure to operate properly.

Figure 18:
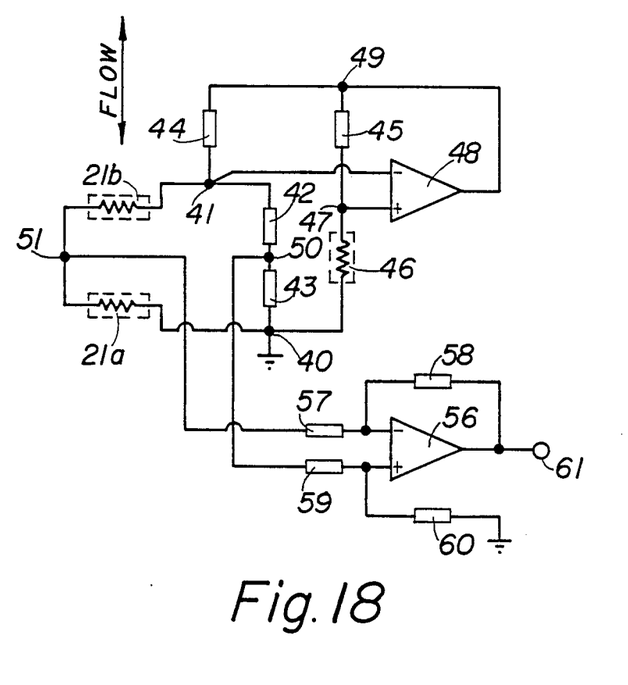
FIG. 18 is a simplified electrical schematic drawing illustrating analog excitation and readout means for a dual sensing element transducer of the type shown in FIG. 1 which is particularly well suited for use with the FIGS. 14, 15 and 16 transducers wherein a single composite flow direction and velocity output signal is provided.

FIG. 18 is a simplified electrical schematic drawing illustrating analog excitation and readout means for a dual sensing element 21a and 21b transducer of the type shown in FIG. 1 which is particularly well suited for use also with the Figs. 14, 15 and 16 transducers wherein a single composite flow direction and velocity signal 61 is provided. As in FIG. 17, the sensing pair of elements 21a and 21b is shown connected as two arms of a four arm Wheatstone bridge which is also formed by resistors 42 and 43. The resistors 42 and 43 are used to balance the bridge when the fluid medium surrounding the transducer is at rest or zero speed. Excitation to the bridge of FIG. 18 is provided at connections 40 and 41 and operation of the direction bridge as a constant resistance bridge is as described for FIG. 17. Bridge balance between points 50 and 51 is detected and is amplified by a differential amplifier 56, thereby providing a signal 61 which is a measure of the degree of imbalance of the direction bridge. The signal 61 shows imbalance by swinging to either positive or negative polarity when one or the other of the paired sensing elements 21a or 21b is ventilated at greater speed by impinging fluid flow. The leeward or "down wind" element will "see" a lesser flow speed because of the blocking which is caused by the other or "up wind" element. The magnitude of the resulting differential output signal 61 is a direct measure of speed. Resistors 57 and 59 are the input resistors to amplifier 56 and resistors 58 and 60 are the feedback resistors. Differential gain is set by the ratio of feedback resistors 58 and 60 respectively to input resistors 57 and 59. Typical amplifier gain is in the range of twenty or twenty five for full scale air flow of, for example, 25 meters per second.

Figure 19:
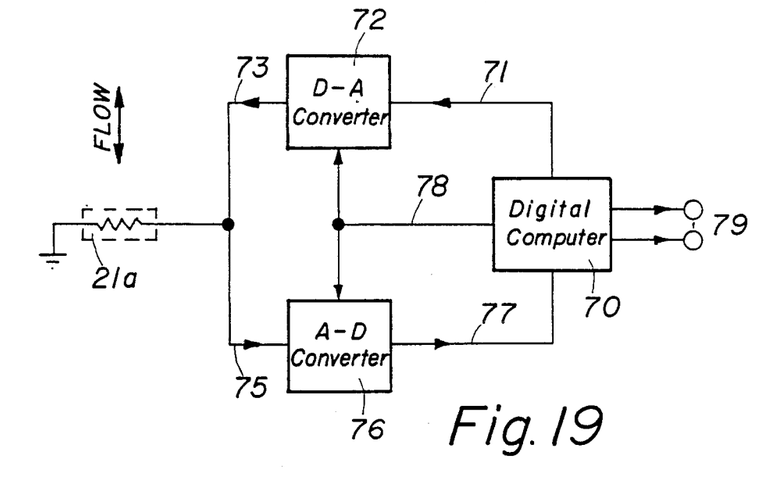
FIG. 19 is a simpified electrical schematic drawing which illustrates excitation and readout of an individual heat loss transducer sensing element which is under operation and control by digital computer means.

FIG. 19 is a simplified electrical schematic drawing which illustrates excitation and readout means for an individual heat loss transducer sensing element 21a which is under operation and control by digital computer means 70. A digital computer or micro-computer 70 is used to control 78 a digital-to-analog converter 72 (numerical code to voltage or current converter) and an analog-to-digital converter 76 (voltage to numerical code converter) which are used to excite 73 and read out 75 resistive transducer sensing element 21a back through the micro-computer 70 producing coded outputs at 79 which can be recorded, displayed, further processed or used to operate and control other real time or delayed time (off-line) processes. Micro-computer 70 periodically or aperiodically excites and reads out the heat loss operating condition or power dissipation level of resistive sensing element 21a, measuring the replaced power lost by sensing element 21a, when heated, to the flowing fluid stream. Results computed by micro-computer 70 are presented at output lines 79 and are also used by presenting them in modified form over connections 71 to digital-to-analog converter 72 which operates the sensing element 21a at a level determined by computer 70. Digital codes signifying the transducer signal levels are fed 71 to digital-to-analog converter 72, are converted to analog voltage or current levels and fed 73 to sensing element 21a whose operating power level is sensed 75 and fed to analog-to-digital converter 76 which passes a digital numerical code 77 to computer 70. Sensing element 21a can be rapidly commanded to operate at any arbitrary power level, subject to the power delivery limits of digital-to-analog converter 72, and as long as the power handling capability of sensing element 21a is not exceeded. When operated at a very low power level, sensing element 21a can be used as a temperature sensing transducer, facilitating measurement of local surrounding ambient temperature. When operated at higher power levels, a non-zero temperature coefficient of resistance sensing element 21a exhibits anemometer performance, which is to say that it loses heat to the fluid surrounding itself and changes with the motional speed of that fluid. Since operating power levels are all under the control of computer 70, and may be changed at high speeds, it is possible to solve fluid mechanics or thermal fluid flow operating equations in several unknowns in order to determine the heat transfer coefficients for transducer 21a. The solution of sets of simultaneous equations in several unknows may, for example, be used to determine values of wind speed, air temperature, air density and the like by operating the transducer 21a at a series of different temperatures.

Figure 20:
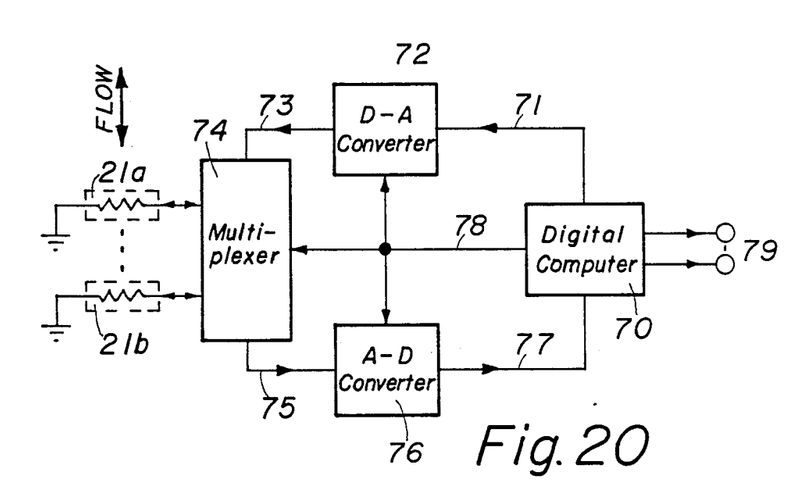
FIG. 20 is a simplified electrical schematic drawing which illustrates excitation and readout of a dual sensing element transducer of the type shown in FIG. 1 which is under operation and control by digital computer means providing for operation and readout of plural sensing elements.

FIG. 20 is a simplified electrical schematic drawing that illustrates excitation and readout of a dual sensing element transducer 20, of the type shown in FIG. 1, which is under operation and control by digital computer means thereby providing for operation and readout of plural sensing elements 21a and 21b as well as plural transducers 20. FIG. 20 is the same as FIG. 19 save for addition of multiplexer 74 (multi-channel electronic switch or electro-mechanical switch) which connects to two or more sensing elements 21a . . . 21b, permitting the shared operation of the digital computer 70 and signal converters 72 and 76 by multiple sensing elements 21a and 21b, plural thermal anemometer 20 assemblies, and other forms of resistances which may be used as sensing elements. All of the transducer variants herein described may be operated by the FIG. 20 circuit. When, for example, two sensing elements 21a and 21b are operated as shown, the FIG. 20 circuit provides a method to further enhance signal-to-noise levels of transducer 20 by alternately switching each element 21a and 21b on and off by external circuit means, inspecting the heat lost to the flowing stream by each element 21a and 21b of the transducer pair 20 serially rather than at the same time in parallel fashion. This step results in an immediate reduction of power needed for excitation by 50%. The larger fluid flow signal or power consumed may be attributed to the sensing element which is facing the direction from which the fluid is flowing. As another example, when using the FIG. 20 circuit configuration, a single sensing element 21a or its resistor equivalent can be used for fluid property sensing while a second resistive sensing element is used for sampled continuous temperature sensing of the fluid.

Figure 21:
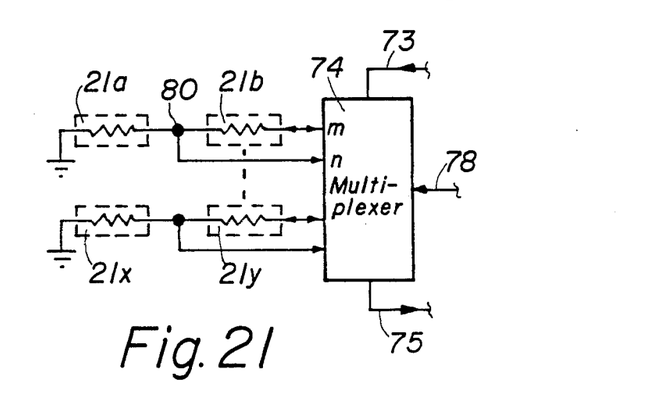
FIG. 21 describes a portion of FIG. 20 which shows the use of series connected plural sensing elements of the type shown in FIG. 1.

FIG. 21 describes a portion of the circuit of FIG. 20 illustrating how the multiplexer 74 can be used alternatively with series connected resistive sensing elements, 21a and 21b . . . 21x and 21y, which are excited and read out as if each series pair is a single sensing element. Series connection of resistive sensing conductors 21a and 21b is shown at multiplexer 74 switch channel m. A mix of single and paired resistive sensing conductors can be operated in this manner, sharing the digital computer generated commands 78 through multiplexer switch 74. For example, the signal at junction 80, connected to multiplexer 74 switch channel n, can be used to indicate direction sign sense alone, identifying which resistive sensing conductor, 21a or 21b, is receiving greater ventilation by incident fluid flow. It should also be noted that more than two resistive sensing conductors can be series connected in this manner to multiplexer 74 as the particular measurement application may require.

I claim:

1. A directional thermal anemometer transducer comprising:

electrically non-conducting oblong substrate having a longitudinal axis and having at least two closely spaced opposing areas substantially thermally and electrically isolated from one another, each area covered with a non-zero temperature coefficient resistive sensing conductor, the conductor in each area extending only within the region of direct exposure to unseparated connected flow over the transducer substrate for flow in the plane defined by the longitudinal axis and the centers of the opposing areas, further including at least one cylindrical bar positioned in close proximity to and parallel with the resistive sensing conductor sensing elements to create aerodynamic turbulence to improve performance for shallow angles between incident flow and the transducer longitudinal axis.

2. A directional thermal anenometer transducer comprising:

electrically non-conducting oblong structure having a longitudinal axis and having at least two closely spaced opposing areas substantially thermally and electrically isolated from one another, each area covered with a non-zero temperature coefficient resistive sensing conductor, the conductor in each area extending only within the region of direct exposure to unseparated connected flow over the transducer substrate for flow in the plane defined by the longitudinal axis and the centers of the opposing areas, further including a pair of barriers mounted at each end of said transducer and perpendicular to the longitudinal axis of said transducer, the barriers positioned to create aerodynamic turbulence to improve shallow angle performance for incident flow nearly parallel to the longitudinal axis of said transducer.

3. The directional thermal anenometer transducer according to claim 1 or claim 2 wherein the substrate includes a pair of cylindrical elements wherein the two cylindrical elements are joined by means of an adhesive.

4. The directional thermal anenometer transducer according to claim 1 or claim 2 in which the substrate includes a pair of cylindrical elements wherein the two cylindrical elements are joined by means of an applied protective coating over the resistive sensing conductor substrate.

5. A directional thermal anenometer transducer comprising:

electrically non-conducting oblong substrate having a longitudinal axis and having at least two closely spaced opposing areas substantially thermally and electrically isolated from one another, each area covered with a non-zero temperature coefficient resistive sensing conductor, the conductor of each area extending only within the region of direct exposure to unseparated connected flow over the transducer substrate for flow in the plane defined by the longitudinal axis and the centers of the opposing areas, wherein the resistive sensing conductor in each of the at least two areas is centrally cut for a majority of its axial length in the stagnation region at the centers of the opposing areas of the substrate to permit cantilever mounting of the transducer element.

* * * * *

UNITED STATES PATENT AND TRADEMARK OFFICE
CERTIFICATE OF CORRECTION

PATENT NO. : 4,794,795

DATED : January 3, 1989

INVENTOR(S) : Robert S. Djorup

It is certified that error appears in the above-identified patent and that said Letters Patent is hereby corrected as shown below:

Column 13, line 55, "opening" should be --operating--;
           line 62, "comination" should be --combination--;

Signed and Sealed this

Thirtieth Day of May, 1989

Attest:

*Attesting Officer*

DONALD J. QUIGG

*Commissioner of Patents and Trademarks*